Jan. 5, 1926.
E. E. KELLOGG
VEHICLE WHEEL
Filed May 23, 1922
1,568,672
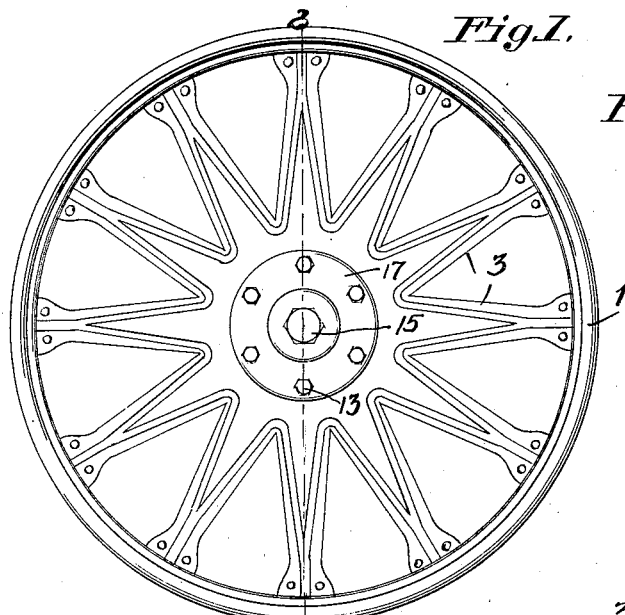
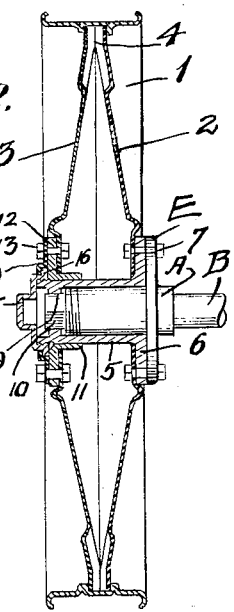
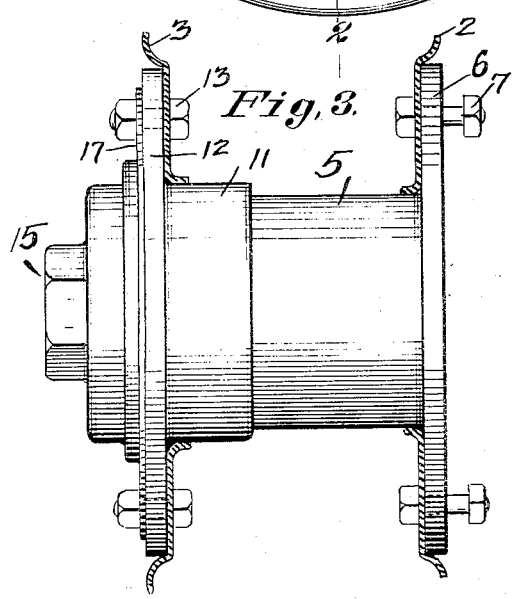
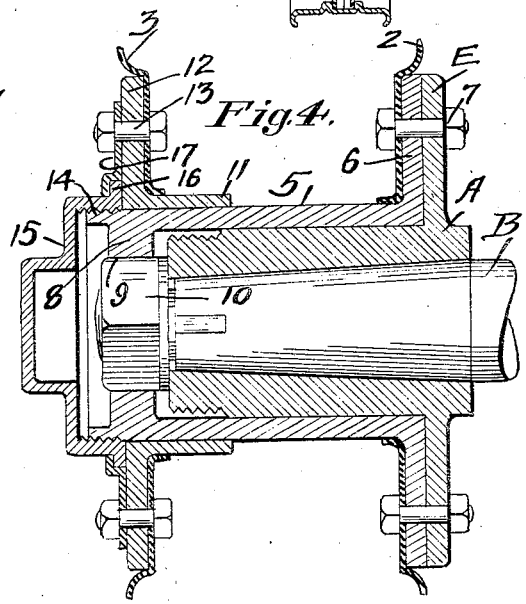
Inventor
E.E. Kellogg
By ____ Attorneys.

Patented Jan. 5, 1926.

1,568,672

UNITED STATES PATENT OFFICE.

EDWARD E. KELLOGG, OF NORWALK, CALIFORNIA, ASSIGNOR OF ONE-HALF TO A. T. SMITH, OF LOS ANGELES, CALIFORNIA.

VEHICLE WHEEL.

Application filed May 23, 1922. Serial No. 562,994.

*To all whom it may concern:*

Be it known that I, EDWARD E. KELLOGG, a citizen of the United States, and a resident of Norwalk, county of Los Angeles, and State of California, have invented a new and useful Vehicle Wheel, of which the following is a specification.

My invention relates in general to wheels and more particularly to an improved vehicle wheel for use primarily on automobiles.

There are several important requirements to be met in introducing vehicle wheels, especially if used on automobiles. The first concerns the cost of manufacture and to meet this requirement I propose a wheel in which the rim sustaining members ordinarily referred to as spokes and sometimes disks, may be made from sheet metal by stamping, cutting or other appropriate methods and in this way do away with the expense of wooden and wire wheels and the present type of disk wheel. Another requirement relates to the ease and convenience of mounting the wheels to the axle of the vehicle so that it may not only be substituted for an existing wheel but also be capable of being readily manipulated for the purpose of changing tires and in this connection I propose to take advantage of the characteristic features of the so-called demountable rim as a part of my combination. Still another requirement is appearance, and in this connection stamped sheet metal rim sustaining members will offer an attractive appearance aside from the unusual possibilities to be realized by the use of the same from a mechanical point of view as compared with heretofore known types of wheels.

For the purpose of illustrating the salient features of my invention attention is directed to the accompanying drawing in which Figure 1 is a view in side elevation of a wheel made in accordance with the invention; Figure 2 a cross-section on the line 2—2 of Figure 1; Figure 3 is an enlarged detail view of means for mounting the rim sustaining members to the existing hub structure of a vehicle axle and Figure 4 is a sectional view of the same structure.

The important feature of my invention resides in the means for mounting the rim sustaining members to the existing hub structure of a wheel axle and in this connection I propose to use a suitable tire rim (1) which is mounted direct to the rim sustaining members without using the customary felly at the same time, leaving the rim free to be removed, in fact in a more convenient manner than possible with the conventional construction. The rim sustaining members preferably comprise a curvilinear structure either of the disk or spoke type. In practice I prefer to use a pair of these rim sustaining members such as (2) and (3) with the same arranged in confronting relation and with their perimeters joined as at (4) to engage lugs, notches, grooves or the like on the inside circumference of the rim (1) with the members diverging from the rim toward the hub. The centers of the members being spaced axially and with means for varying their relative spaced relation for realizing a radial expansion of their circumference so as to bind their perimeters to the rim or release the rim.

As above stated my improvement resides primarily in means for realizing a convenient and practical mounting for connecting the centers of the rim sustaining members to either a driving axle or a steering axle and at the same time leave them free to be manipulated for holding or releasing the rim as stated.

Taking into account that there are many types of axle and hub structures all of which relate to either a driving or steering type I propose to provide means which are well adapted to all of these types since to adapt my construction to an existing type I do not have to disturb the existing wheel hub except of course to remove the spokes which will leave only the hub (A) which is keyed to the axle (B) of the driving type or serving as a housing for the bearing of a steering type of axle. Of course the front hub plate which is used in conjunction with the back flange (E) of the hub for clamping the spokes is done away with entirely. For equipping an axle with my wheel I employ a sleeve (5) which is slipped over the hub (A) and having an upstanding flange (6) made to abut against the flange (E) and with bolts (7) clamping the two flanges together as well as clamping the center of the inside one of the rim sustaining members to the flange (6). The front of the sleeve (5) is closed by the integral ring (8) with exception of a square opening (9) made to receive the square end (10) of the axle (B)

or it may be a nut on the end of the axle (B). In either case the square end is fixed in driving relation with the axle and when received in the square opening (9) of the ring (8) the sleeve (5) thus becomes fixed in driving relation relative to the axle.

In a steering type of axle the ring (8) may be dispensed with or else the squared opening (9) may be enlarged so as to leave the end of the axle free to turn.

As a means for mounting the front one of the rim sustaining members, for instance the member (3), I prefer to employ a collar (11) having an upstanding annular flange (12) with bolts or the like (13) used to clamp the member to the flange in the same manner as the member (2) is clamped. The collar (11) is of a larger diameter than the sleeve (5) and slips over the same. To fix the collar thereon a cap (15) is used, the same being threaded internally to engage the threads (14) and having an outwardly presenting flange (16) made to abut against the face of the flange (12) so as to impart a push to the same for drawing the members (2) and (3) together and radially expanding their outer circumferences to clamp the rim (1). In order to impart a pull to the collar (11) for spreading the centers of the members (2) and (3) for the purpose of releasing the rim (1), I propose to use a lug or the like (17) which is clamped to the flange (12) by the bolts (13) and made to overly the flange (16) of the cap so that it is practically interlocked with the collar (11) and when the cap (15) is unscrewed it will pull the center of the member (3) away from the center of the member (2).

The structure just described in so far as concerns the details is gotten up for either a driving axle or a steering axle. Of course, certain changes may be made to accommodate various types without departing from the spirit of the invention.

In practice the face plate of the existing hub is removed leaving the flange (E) so that the sleeve (5) may be slipped over the hub structure which is left by removing the spokes, and the collar (11) is likewise slipped over the sleeve. The hub cap is used to draw the centers of the rim sustaining members (2) and (3) together or spread them apart to clamp or release the rim (1).

I claim:

In a wheel, a hub having a flange near its inner end, a sleeve on the hub having a flange adapted to be secured to the former flange, a member slidable on the sleeve having a flange thereon in opposing relation to the second flange, rim sustaining members diverging from the rim toward the hub secured to the opposing flanges in confronting relation, and means for changing the spacing between the two opposing flanges whereby the sustaining members are radially expanded or contracted for engagement with or disengagement from the rim.

EDWARD E. KELLOGG.